(12) United States Patent
Fremont et al.

(10) Patent No.: US 9,708,918 B2
(45) Date of Patent: Jul. 18, 2017

(54) HOLLOW-BLADE TURBINE VANE MADE FROM COMPOSITE MATERIAL, TURBINE OR COMPRESSOR INCLUDING A NOZZLE OR GUIDE VANE ASSEMBLY FORMED BY SUCH BLADES, AND TURBOMACHINE COMPRISING SAME

(71) Applicants: HERAKLES, Le Haillan (FR); SNECMA, Paris (FR)

(72) Inventors: Elric Fremont, Merignac (FR); Antoine Beaujard, Vaux Le Penil (FR); Didier Fabre, Avon (FR); Guy Burlet, Fontainebleau (FR)

(73) Assignees: HERAKLES, Le Haillan (FR); SNECMA, Paris (FR)

( * ) Notice: Subject to any disclaimer, the term of this patent is extended or adjusted under 35 U.S.C. 154(b) by 534 days.

(21) Appl. No.: 14/362,186

(22) PCT Filed: Nov. 26, 2012

(86) PCT No.: PCT/FR2012/052722
§ 371 (c)(1),
(2) Date: Jun. 2, 2014

(87) PCT Pub. No.: WO2013/079859
PCT Pub. Date: Jun. 6, 2013

(65) Prior Publication Data
US 2014/0356151 A1    Dec. 4, 2014

(30) Foreign Application Priority Data
Dec. 1, 2011    (FR) .................................... 11 03661

(51) Int. Cl.
*F01D 5/28*    (2006.01)
*F01D 9/04*    (2006.01)
(Continued)

(52) U.S. Cl.
CPC ............ *F01D 5/282* (2013.01); *B29C 70/222* (2013.01); *F01D 9/041* (2013.01); *F01D 9/042* (2013.01);
(Continued)

(58) Field of Classification Search
CPC ..... Y02T 50/672; Y02T 50/673; F01D 5/282; F01D 5/28; F01D 5/147; F01D 5/18;
(Continued)

(56) References Cited

U.S. PATENT DOCUMENTS 3,442,442 A * 5/1969 Seiwert .................. F01D 5/282
415/190
3,572,971 A * 3/1971 Seiwert .................. F01D 5/282
416/214 A
(Continued)

FOREIGN PATENT DOCUMENTS

EP    2154119 A1    2/2010
FR    2625528 A1    7/1989
(Continued)

OTHER PUBLICATIONS

International Search Report for corresponding International PCT Application No. PCT/FR2012/052722, mailed Mar. 21, 2013.

*Primary Examiner* — Eric Keasel
*Assistant Examiner* — Joshua R Beebe
(74) *Attorney, Agent, or Firm* — Workman Nydegger

(57) ABSTRACT

A turbine engine vane is made of composite material comprises a hollow airfoil with an internal passage extending along its entire length, an inner platform, and an outer platform. The airfoil is extended on the outside of the outer platform by an upstream attachment portion and a downstream attachment portion for mounting the vane in a casing. The attachment portions are formed by an attachment extending from the outer longitudinal ends of the pressure (Continued)

side wall and the suction side wall of the airfoil with continuity of the fiber reinforcing texture of the composite material between the walls and the attachment tabs.

20 Claims, 10 Drawing Sheets

(51) Int. Cl.
*F01D 9/06* (2006.01)
*B29C 70/22* (2006.01)

(52) U.S. Cl.
CPC ........ *F01D 9/065* (2013.01); *F05D 2300/603* (2013.01); *Y02T 50/672* (2013.01); *Y02T 50/673* (2013.01)

(58) Field of Classification Search
CPC .......... F01D 5/189; F01D 5/225; F01D 25/24; F01D 25/243; F01D 25/246; F01D 9/04; F01D 9/042; F01D 9/065; F01D 9/041; F05D 2300/603; F05D 2300/6033; F05D 2300/6012; B29C 70/222
See application file for complete search history.

(56) References Cited

U.S. PATENT DOCUMENTS

| | | | |
|---|---|---|---|
| 4,292,008 A * | 9/1981 | Grosjean | F01D 5/186 415/115 |
| 4,626,461 A * | 12/1986 | Prewo | C03C 14/002 428/113 |
| 4,916,997 A * | 4/1990 | Spain | B22F 3/002 156/148 |
| 5,246,736 A | 9/1993 | Goujard et al. | |
| 5,425,622 A * | 6/1995 | Murray | F01D 5/3007 416/217 |
| 5,569,019 A * | 10/1996 | Katariya | F01D 9/042 415/200 |
| 5,965,266 A | 10/1999 | Goujard et al. | |
| 6,676,373 B2 * | 1/2004 | Marlin | B29C 70/34 29/889.71 |
| 7,241,112 B2 * | 7/2007 | Dambrine | B29C 70/48 29/889.7 |
| 7,753,653 B2 * | 7/2010 | Cairo | F04D 29/023 415/200 |
| 8,221,836 B2 | 7/2012 | Philippe et al. | |
| 8,240,975 B1 * | 8/2012 | Ryznic | F02C 6/08 415/1 |
| 8,297,934 B2 * | 10/2012 | Lutz | F01D 5/14 415/200 |
| 8,607,454 B2 | 12/2013 | Blanchard et al. | |
| 2003/0185673 A1 * | 10/2003 | Matsumoto | F01D 5/282 415/159 |
| 2009/0214355 A1 * | 8/2009 | Pereti | B23P 6/002 416/97 R |
| 2009/0317246 A1 | 12/2009 | Lutz et al. | |
| 2010/0015428 A1 | 1/2010 | Philippe et al. | |
| 2011/0008156 A1 | 1/2011 | Prentice et al. | |
| 2011/0311368 A1 | 12/2011 | Coupe et al. | |
| 2012/0055609 A1 | 3/2012 | Blanchard et al. | |
| 2012/0057985 A1 | 3/2012 | Tanahashi et al. | |
| 2012/0099982 A1 | 4/2012 | Coupe et al. | |
| 2012/0196107 A1 | 8/2012 | Philippe et al. | |
| 2013/0089429 A1 | 4/2013 | Nunez et al. | |

FOREIGN PATENT DOCUMENTS

| | | |
|---|---|---|
| JP | 2003148105 A | 5/2003 |
| JP | 2010229006 A | 10/2010 |
| WO | 2010061140 A1 | 6/2010 |
| WO | 2010110325 A1 | 9/2010 |
| WO | 2010116066 A1 | 10/2010 |
| WO | 2010146288 A1 | 12/2010 |
| WO | 2011080443 A1 | 7/2011 |

* cited by examiner

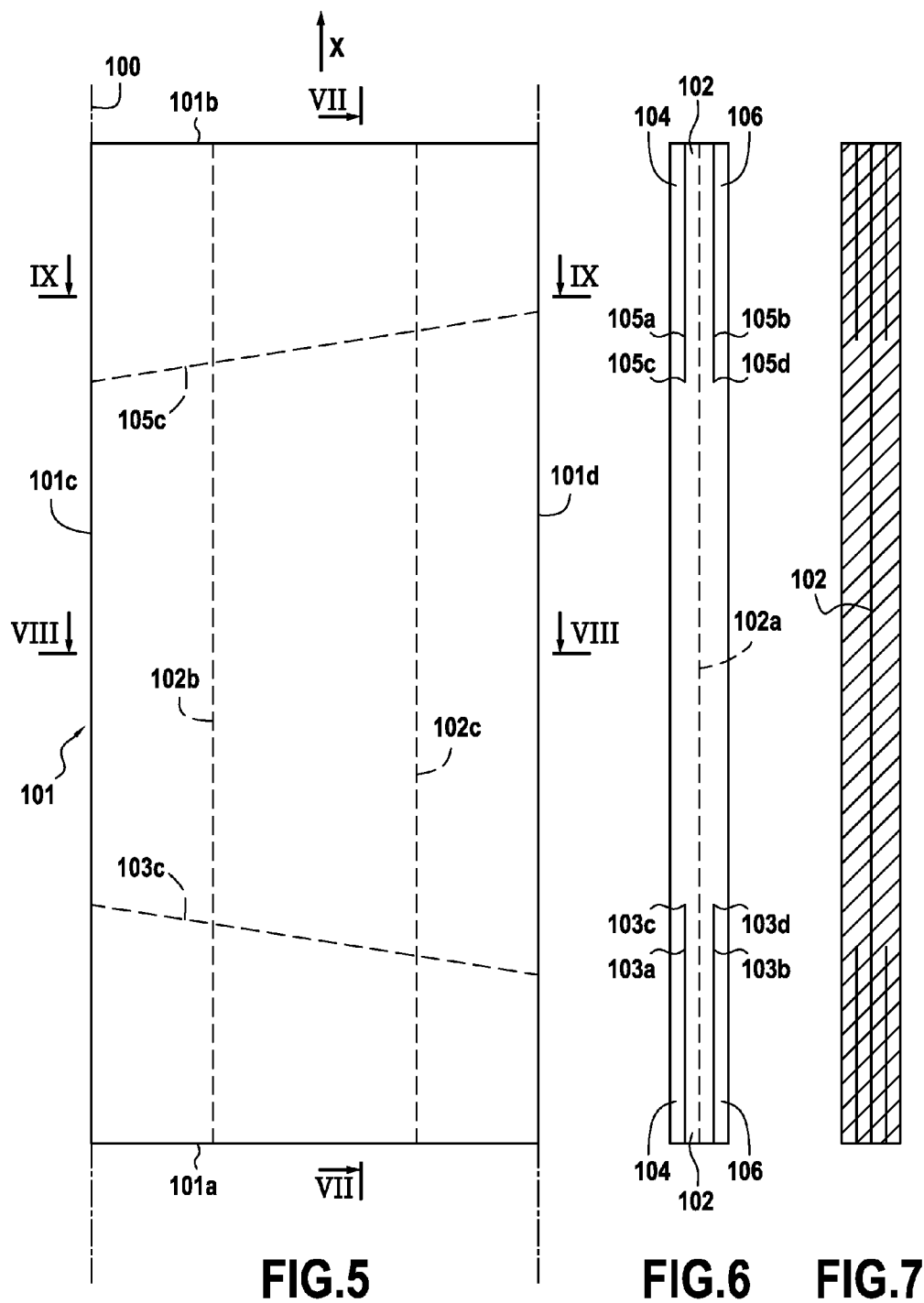

HOLLOW-BLADE TURBINE VANE MADE FROM COMPOSITE MATERIAL, TURBINE OR COMPRESSOR INCLUDING A NOZZLE OR GUIDE VANE ASSEMBLY FORMED BY SUCH BLADES, AND TURBOMACHINE COMPRISING SAME

BACKGROUND OF THE INVENTION

The invention relates to turbine engines, in particular aeroengines or industrial turbines, and it relates more particularly to guide vane assemblies having hollow airfoils for a turbine nozzle or a compressor diffuser.

Increasing the performance of turbine engines and reducing their polluting emissions leads to envisaging ever-higher operating temperatures.

For hot portion elements of turbine engines, proposals have therefore been made to use ceramic materials having a matrix that is constituted at least mostly by a ceramic (CMC). Such materials possess remarkable thermostructural properties, i.e. mechanical properties that make them suitable for constituting structural elements, with the ability to conserve these properties at high temperatures. Furthermore, CMC materials are of density that is much smaller than that of the metal materials conventionally used for hot portion elements of turbine engines.

Thus, Documents WO 2010/061140, WO 2010/116066, and WO 2011/080443 describe making rotor wheel blades for turbine engines out of CMC with inner and outer platforms incorporated in the blades. The use of CMC materials for turbine nozzles has also been proposed, in particular in Document WO 2010/146288.

It is also well known to make turbine nozzles, in particular low pressure nozzles, with vanes having hollow airfoils, i.e. airfoils that present internal longitudinal passages along their entire length between their outer and inner ends. Such passages enable a stream of ventilation air to be conveyed from the outside towards the inside, in particular for cooling the disks of rotor wheels of the turbine.

A nozzle sector made of composite material with hollow blades is described in Document US 2011/0008156. The fiber reinforcement of the composite material is made up of a stack of two-dimensional plies, some of the reinforcing plies of the airfoil extending to a thick upstream end portion of the outer platform of the sector.

OBJECT AND SUMMARY OF THE INVENTION

An object of the invention is to enable hollow-airfoil vanes made of composite material to be mounted easily in a casing with effective take-up of the forces exerted on the airfoils.

In an aspect of the invention, this object is achieved by a turbine engine vane made of composite material comprising a fiber reinforcing structure densified by a matrix and including a hollow airfoil with an internal passage extending along its entire length between a pressure side wall and a suction side wall of the airfoil, an inner platform, and an outer platform, the airfoil being extended on the outside of the outer platform by an upstream attachment portion and by a downstream attachment portion for mounting the vane in a casing, the attachment portions being formed by attachment tabs each extending in line with a portion of the pressure side or suction side wall of the airfoil from an outer longitudinal end, and the fiber reinforcing texture of each attachment tab being in continuity with the fiber reinforcing texture of the pressure side wall or the suction side wall of the airfoil in line with which the tab is situated.

Such a provision enables mounting to be performed using hooks in a manner similar to that commonly used with metal vanes, thus making such a vane easy to incorporate in an already-existing environment, and it ensures that forces are well transmitted between the airfoil and the hooks.

The downstream attachment portion may include at least one downstream attachment tab situated in line with a portion of the suction side wall or of the pressure side wall between a leading edge and a trailing edge of the airfoil.

The upstream attachment portion may include at least one upstream attachment tab situated in line with a portion of the pressure side wall or of the suction side wall in the vicinity of a leading edge of the airfoil.

In an embodiment, the upstream attachment portion comprises two upstream attachment tabs situated respectively in line with a portion of the pressure side wall and in line with a portion of the suction side wall in the vicinity of the leading edge of the airfoil. Positioning the attachment portion at the center of thrust, in the vicinity of the leading edge, enables the aerodynamic forces exerted on the airfoil to be taken up well.

In an embodiment, on the inside of the inner platform, the airfoil is extended by inner tabs extending from inner longitudinal ends of the pressure side and suction side walls of the airfoil with continuity of the reinforcing fiber texture between said walls and said tabs.

The inner tabs may comprise at least a downstream inner tab situated in line with a portion of the suction side wall or with the pressure side wall between the leading edge and the trailing edge of the airfoil.

The inner tabs may comprise at least an upstream inner tab situated in line with a portion of the pressure side wall or of the suction side wall in the vicinity of a leading edge of the airfoil.

The inner tabs may comprise two upstream inner tabs situated respectively in line with a portion of the pressure side wall and with a portion of the suction side wall in the vicinity of the leading edge of the airfoil.

In an advantageous embodiment, the fiber reinforcing texture of the airfoil is a fabric obtained by three-dimensional weaving.

Advantageously, there is continuity of the fiber reinforcing texture between the airfoil and the inner and outer platforms.

In another of its aspects, the invention provides a turbine engine turbine having a turbine casing and at least one turbine nozzle including a set of vanes as defined above, and the invention also provides a turbine engine compressor having a compressor casing and at least one compressor diffuser including a set of vanes as defined above.

Preferably, the vanes are mounted in the turbine or compressor casing with a sealing shroud arranged on the outside of the vanes and presenting orifices in communication with the internal passages of the airfoils of the vanes.

In an embodiment, ventilation tubes extend in the internal passages of the vanes and are connected to the shroud by tubular connection parts.

According to yet another of its aspects, the invention provides a turbine engine having a turbine and/or a compressor as defined above.

BRIEF DESCRIPTION OF THE DRAWINGS

The invention can be better understood on reading the following description made by way of non-limiting indication with reference to the accompanying drawings, in which:

FIG. 5 is a diagrammatic plan view of a woven fiber blank for use in making a fiber preform for a vane of the type shown in FIG. 1, in a first method of fabricating such a vane;

FIG. 6 is a side view of the FIG. 5 blank;

FIG. 7 is a diagrammatic section view on plane VII-VII of FIG. 5;

DETAILED DESCRIPTION OF EMBODIMENTS

Figure 1:
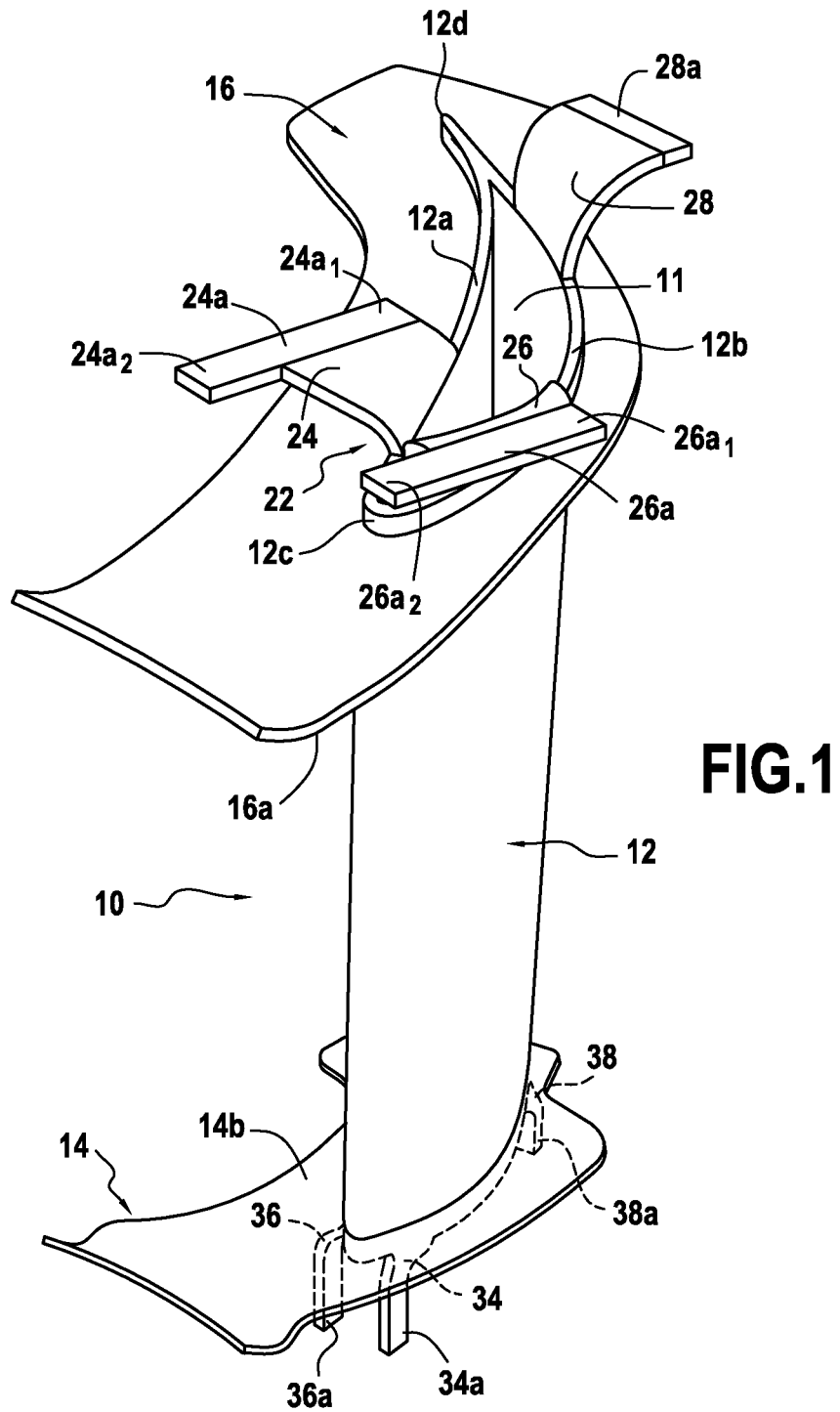
FIG. 1 is a diagrammatic perspective view of a turbine nozzle vane in an embodiment of the invention.

FIG. 1 is a highly diagrammatic view of a stationary guide vane 10 of a turbine nozzle in a turbine engine, e.g. an aeroengine. The vane 10 is made of CMC material and comprises an airfoil 12 with inner and outer platforms 14 and 16.

Throughout this text, the terms "inner" and "outer" are used with reference to a radial position relative to the axis of the turbine engine.

The outer face 14b of the platform 14 and the inner face 16a of the platform 16 are for defining the gas flow passage through the turbine once the vane 10 has been mounted in a turbine casing.

The airfoil 12 extends between the platforms 14 and 16 to which it is secured, and at its ends it projects on the inside of the platform 14 and on the outside of the platform 16. The airfoil 12 is hollow with a longitudinal internal passage 11 that extends all along the airfoil and that opens out at both of its ends. In known manner, the passage 11 is intended in particular for passing a stream of cooling air.

In the example shown, the platforms 14 and 16 extend between their upstream and downstream ends along general directions that form non-zero angles relative to a plane normal to the longitudinal direction of the airfoil 12.

Throughout this text, the terms "upstream" and "downstream" are used with reference to the flow direction of the stream through the turbine engine.

At its outer end (FIGS. 1 and 2), on the outside of the platform 16, the airfoil 12 is extended by an upstream attachment portion 22 and a downstream attachment portion 28.

In the example shown, the upstream attachment portion 22 is constituted by two attachment tabs 24, 26 situated respectively in line with a portion of the pressure side wall 12a of the airfoil 12 and in line with a portion of the suction side wall 12b of the airfoil 12, in the vicinity of the leading edge 12c of the airfoil 12. On its outside, the pressure side wall 12a defines the pressure side face of the airfoil 12, and on its inside it defines the passage 11. On its outside, the suction side wall 12b defines the suction side face of the airfoil 12, and on its inside it defines the passage 11.

The attachment tabs 24 and 26 are of shapes that are rounded respectively towards the pressure side and the suction side, and they have terminal portions 24a and 26a that extend substantially axially with their outer and inner faces situated substantially on respective common annular surfaces, about an axis that is the axis of the turbine in which the vane is to be mounted. The terminal portions 24a and 26b are connected to the pressure side and suction side walls of the airfoil 12 over only respective portions $24a_1$ and $26a_1$ of their axial dimensions, starting from their downstream ends, with the upstream end portions $24a_2$ and $26a_2$ of the terminal portions 24a and 26a extending freely.

The downstream attachment portion 28 forms a single attachment tab situated in line with a portion of the suction side wall 12b of the airfoil 12 between the leading edge 12c and the trailing edge 12d of the airfoil 12. The attachment tab 28 has a shape that is curved towards the suction side, and the downstream terminal portion 28a of the attachment tab 28 has its outer and inner faces situated substantially on respective annular surfaces.

The description above relates to making the upstream attachment portion 22 in the form of two attachment tabs on either side of the leading edge. In a variant, it would nevertheless be possible to provide a single upstream attachment tab.

In the description above, the downstream attachment portion 28 is constituted by a single attachment tab. In a variant, it would be possible to provide more than one downstream attachment tab, each being in line with a portion of the suction side wall 12b of the airfoil 12.

At its inner end (FIGS. 1 and 3), on the inside of the platform 14, the airfoil 12 may be extended by upstream inner tabs 34 and 36, and by a downstream inner tab 38.

The upstream inner tabs 34 and 36 are situated respectively in line with a portion of the pressure side wall 12a of the airfoil 12 and in line with a portion of the suction side wall 12b of the airfoil 12 in the vicinity of the leading edge 12c of the airfoil 12. The terminal portions 34a and 36a of the inner tabs 34 and 36 extend substantially radially.

The downstream inner tab 38 in line with a portion of the suction side wall 12b of the airfoil 12 between the leading edge 12c and the trailing edge 12d of the airfoil 12. The terminal portion 38a of the inner tab 38 extends substantially radially. In a variant, the downstream inner tab could be situated in line with a portion of the pressure side wall 12a of the airfoil 12.

Embodiments of a vane such as the vane 10 made out of a reinforcing fiber texture constituted by a fabric obtained by three-dimensional weaving are described below. Fabricating the vane 10 comprises forming a fiber preform of a shape that corresponds to the shape of the vane, and densifying the preform with a ceramic matrix.

Figure 2:
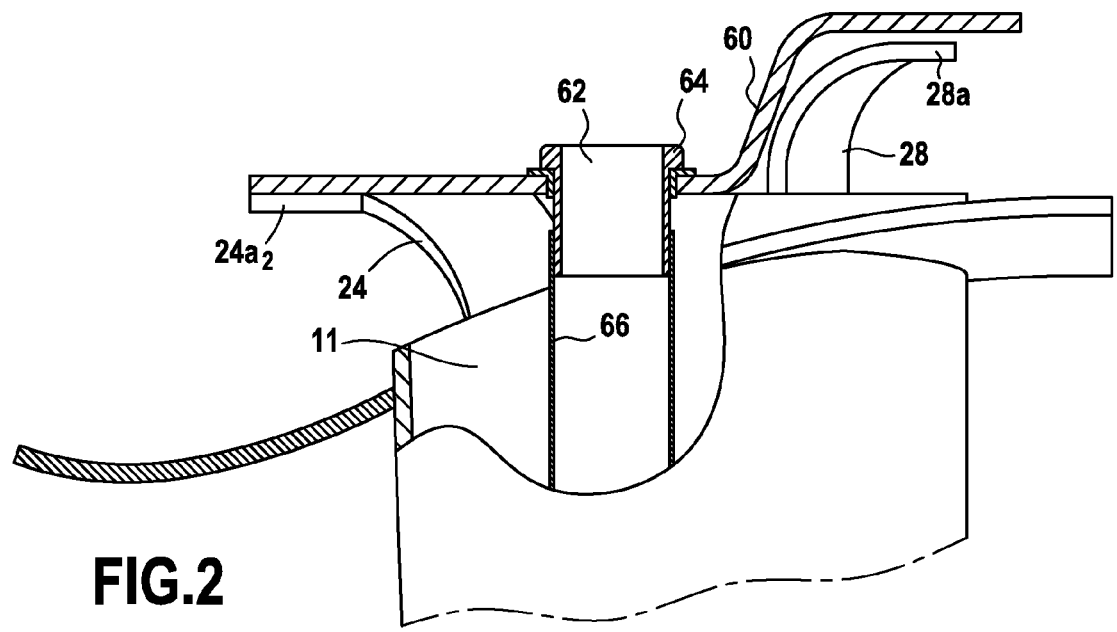
FIG. 2 is a fragmentary diagrammatic section view of the outer portion of the FIG. 1 vane assembled with a sealing shroud.
Figure 3:
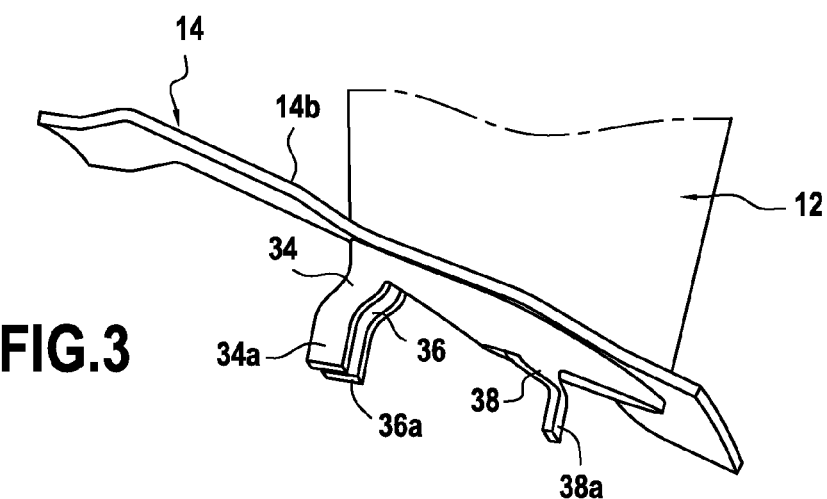
FIG. 3 is a diagrammatic fragmentary perspective view of the inner portion of FIG. 1 vane.
Figure 4:
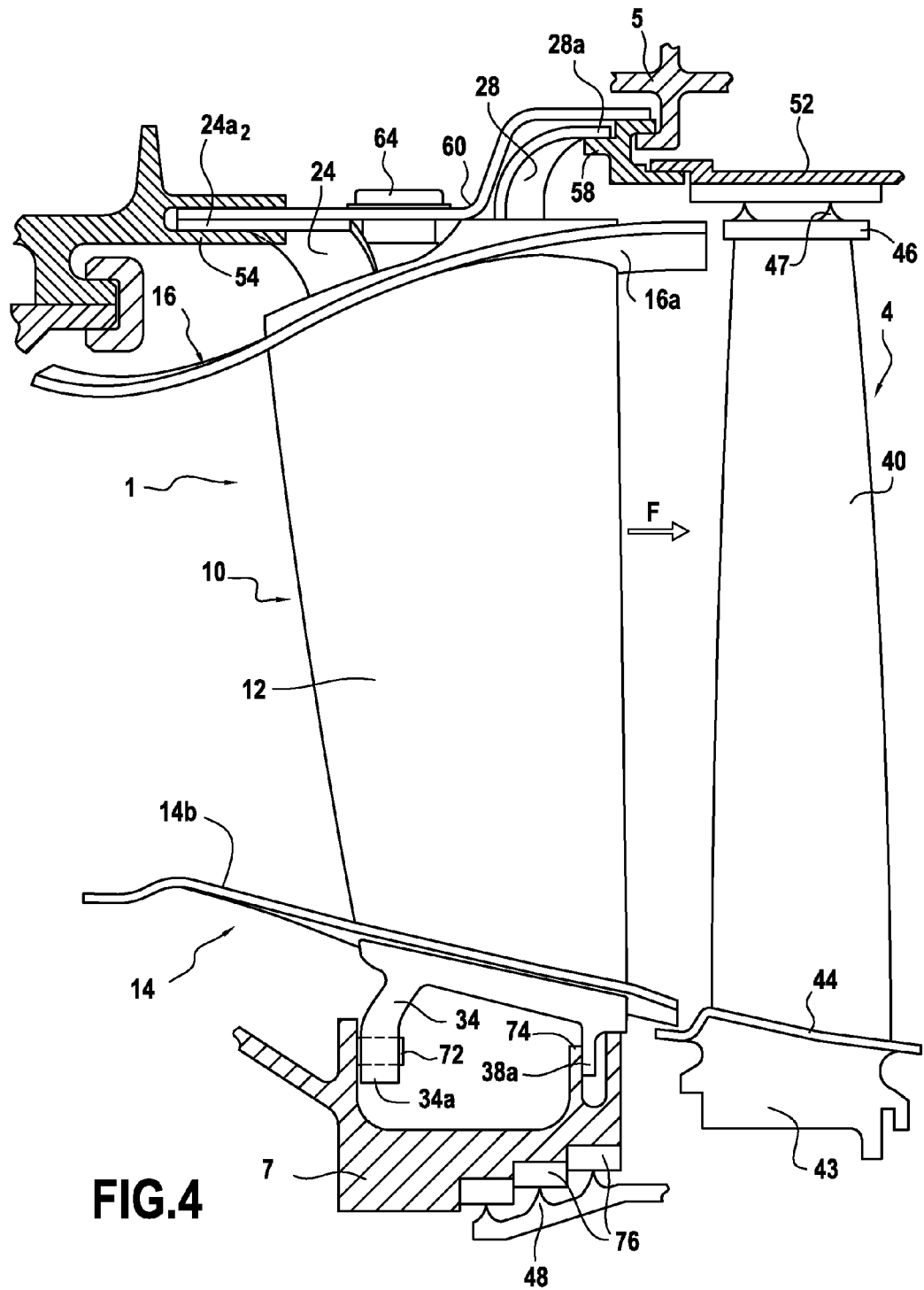
FIG. 4 is a highly diagrammatic fragmentary axial half-section view of a turbine of an aviation turbine engine.

FIG. 4 shows a portion of a turbine in an aviation turbine engine, for example a low pressure turbine having a turbine nozzle 1 comprising a plurality of vanes 10 as shown in FIGS. 1 to 3, together with a rotor wheel 4. The nozzle 1 is mounted in a metal outer turbine casing 5. The turbine may comprise a plurality of stationary nozzles alternating with rotor wheels in the flow direction of the gas stream through the turbine (arrow F).

Each rotor wheel comprises a plurality of blades 40 each having an inner platform 44, an outer platform 46, and an airfoil 42 extending the platforms 44 and 46 and connected thereto. On the inside of the platform 44, the blade is extended by a root engaged in a housing in a disk 43 of a turbine rotor. On the outside, the outer platform 46 carries wipers 47 facing an abradable material carried by a sectorized ring 52 secured to the outer casing 5 in order to provide sealing at the tips of the blades 40. The blades 40 may be conventional metal blades or they may be CMC material blades obtained as described in the above-mentioned Documents WO 2010/061140, WO 2010/116066, or WO 2011/080443, for example.

On the outside, the free end portions $24a_2$ and $26a_2$ of the terminal portions of the upstream attachment tabs 24 and 26 of the vanes 10 of the nozzle 1 are engaged in a groove of a hook 54 secured to the outer casing 5, while the terminal portion 28a of the downstream attachment tabs 28 of the vanes 10 are engaged on an outer annular face of a part 58 secured to the outer casing 5. The nozzle 1 is thus mounted in the outer casing 5 in a manner similar to mounting a conventional metal nozzle.

An annular sealing shroud 60 (FIGS. 2 and 4) extends on the outside of the vanes 10. In the example shown, the shroud 60 bears upstream against the outer faces of the terminal portions 24a and 26a of the attachment tabs 24 and 26. The shroud 60 bears downstream against an outer annular face of the part 58 that is distinct from the part against which the terminal portions of the attachment tabs 28 bear. In a variant, the shroud 60 could be engaged upstream in a groove other than the groove in which the terminal portions of the attachment tabs 24 and 26 are engaged. Still in a variant, the shroud could bear upstream and downstream on the terminal portions of the attachment tabs 24 and 26 and of the tabs 28.

In the example shown, it should be observed that the terminal portions 24a and 26a of the attachment tabs are engaged in the hooks 54 over a major fraction of their axial extent.

Communication between the outside of the shroud 60 and the internal passages 11 in the hollow airfoil 12 of the vanes 10 takes place through orifices 62 formed in the shroud 60 in register with the outer ends of the internal passages 11 (FIG. 2). Tubular connection parts in the form of inserts 64 are engaged in the orifices 62 for connection to ventilation tubes 66 extending along the insides of the internal passages 11.

On the inside, the inner tabs 34 and 36 have their terminal portions 34a and 36a bearing circumferentially against abutments 72 secured to a metal inner casing 7 of the turbine, while the inner tab 38 has its terminal portion bearing axially on an abutment 74 secured to the inner casing 7. Wipers 48 secured to the turbine rotor co-operate with an abradable coating 76 carried by the inner casing to provide sealing on the inside.

Thus, a degree of freedom to move in the radial direction is obtained between the turbine nozzle 1 and the inner casing 7.

In a variant, the inner tabs 34, 36, and 38 could be used for supporting a sectorized ring carrying the abradable material.

A first method of fabricating a vane 10 such as the vane shown in FIGS. 1 to 3 is described below.

The method comprises forming a fiber preform presenting a shape that corresponds to the shape of the vane, and densifying the preform with a matrix.

FIG. 5 is a plan view of a fiber blank 101 from which a fiber preform for the vane 10 can be formed.

The blank 101 in this example is obtained from a strip 100 woven by three-dimensional (3D) weaving or by multilayer weaving, the strip 100 extending generally in a direction X that corresponds to the longitudinal direction of the vane to be fabricated. By way of example, the weaving is formed with warp yarns extending in the direction X.

As shown in FIGS. 5 to 7, the blank 101 comprises, across its thickness, a first portion 102 situated between a second portion 104 and a third portion 106, the portion 102 being connected to the portions 104 and 106 by 3D weaving except in non-interlinked zones 103a and 105a between the portion 102 and the portion 104, and non-interlinked zones 103b and 105b between the portion 102 and the portion 106. The non-interlinked zones 103a and 103b extend across the entire width of the blank 101 (dimension in the weft direction) from an end 101a of the blank 101 to boundaries of non-interlinking 103c and 103d. The boundaries of non-interlinking 103c and 103d extend between the longitudinal edges 101c and 101d of the blank 101 in a direction forming a non-zero angle relative to the weft direction in order to match the slope of the inner platform 14. The non-interlinked zones 105a and 105b extend across the entire width of the blank 101 from the opposite end 101b of the blank 101 to boundaries of non-interlinking 105c and 105d. The boundaries of non-interlinking 105c and 105d extend between the longitudinal edges 101c and 101d of the blank 101 in a direction that makes a non-zero angle relative to the weft direction in order to match the slope of the outer platform 16.

In addition, a non-interlinked zone 102a is formed substantially in the middle of the portion 102 along the entire length of the blank 101 and at a distance from the longitudinal edges 101c and 101d between limits 102b and 102c. The non-interlinked zone 102a is for enabling the internal passage to be formed in the hollow airfoil of the vane that is to be fabricated.

In well-known manner, a non-interlinked zone is provided between two layers of warp yarns by omitting to pass a weft yarn across the non-interlinked zone where it would otherwise link together yarns of warp layers situated on either side of the non-interlinked zone.

Figure 8:
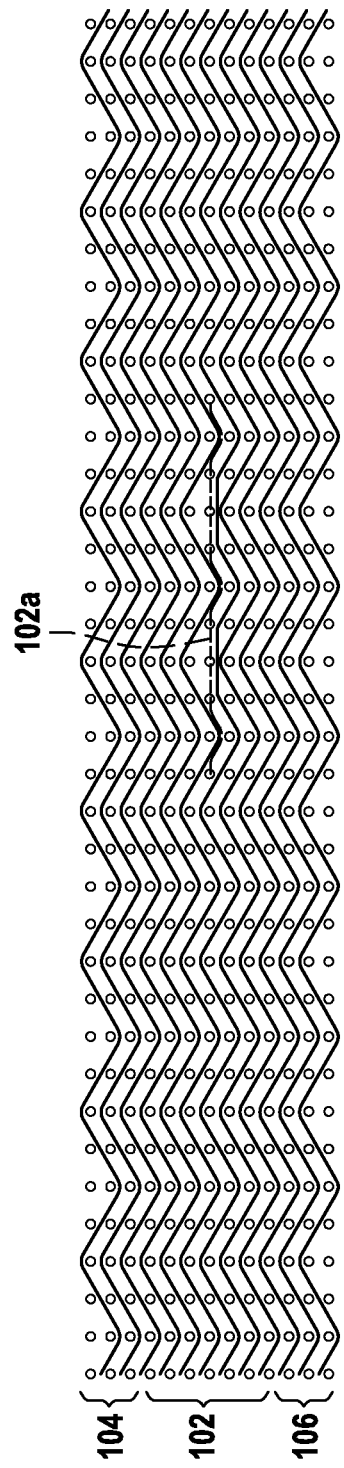
FIGS. 8 and 9 are diagrammatic views of weaving planes of the FIG. 2 blank seen in section on planes VIII-VIII and IX-IX of FIG. 5.
Figure 9:
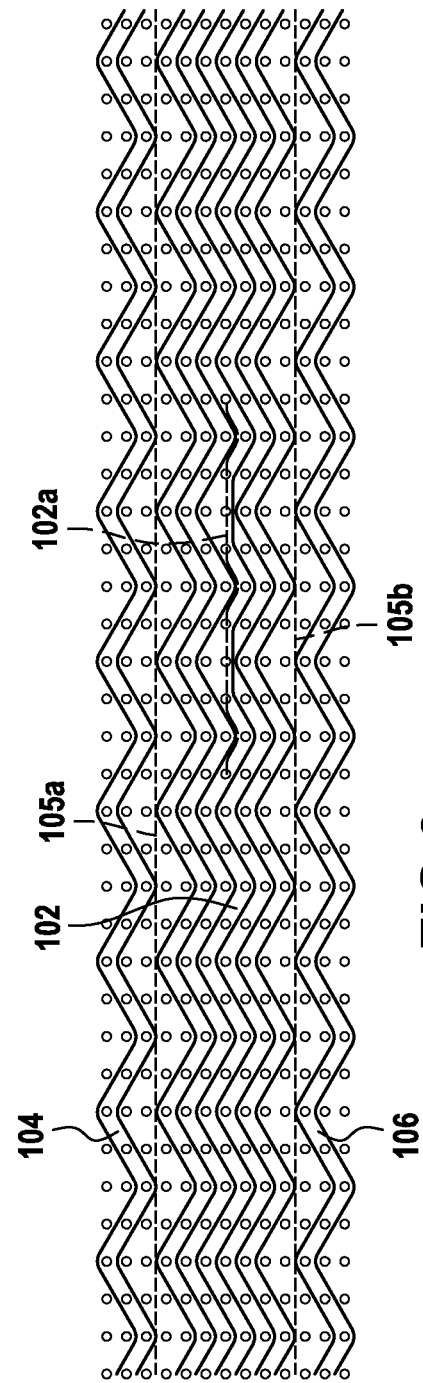

The planes of FIGS. 8 and 9 show an example of 3D weaving using an interlock weave with non-interlinked zones 102a, 105a, and 105b, the non-interlinked zones 103a and 103b being obtained in the same manner as the non-interlinked zones 105a and 105b. In FIGS. 8 and 9, non-interlinked zones are represented by dashed lines. The portion 102 has a plurality of layers of warp yarns (six in the example shown) that are interlinked by 3D weaving, except in the non-interlinked zone 102a. Each of the portions 104 and 106 comprises a plurality of layers of warp yarns (three in the example shown) that are interlinked by 3D weaving. Outside the non-interlinked zone 102a, between the boundaries of non-interlinking 103c and 105c and between the boundaries of non-interlinking 103d and 105d, the layers of warp yarns in the portions 102, 104, and 106 are all interlinked, in the example shown.

Figure 10:
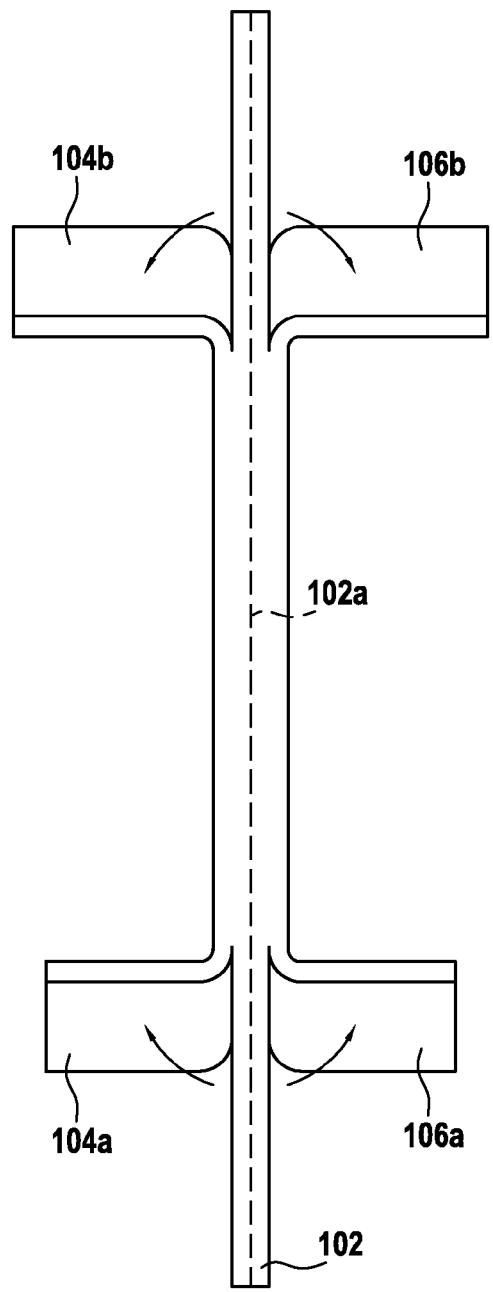
FIGS. 10 to 13 are diagrammatic views showing steps in making a vane preform from the fiber blank of FIGS. 5 to 9.

After weaving, the segments 104a, 104b and 106a, 106b of the portions 104 and 106 that are not interlinked with the portion 102 are folded out as shown in FIG. 10 in order to form preform portion for the platforms 14 and 16, the segments 104a, 104b being adjacent to the non-interlinked zones 103a, 105a and the segments 106a, 106b being adjacent to the non-interlinked zones 103b, 105b. The folds are thus made at the boundaries of non-interlinking.

Figure 11:
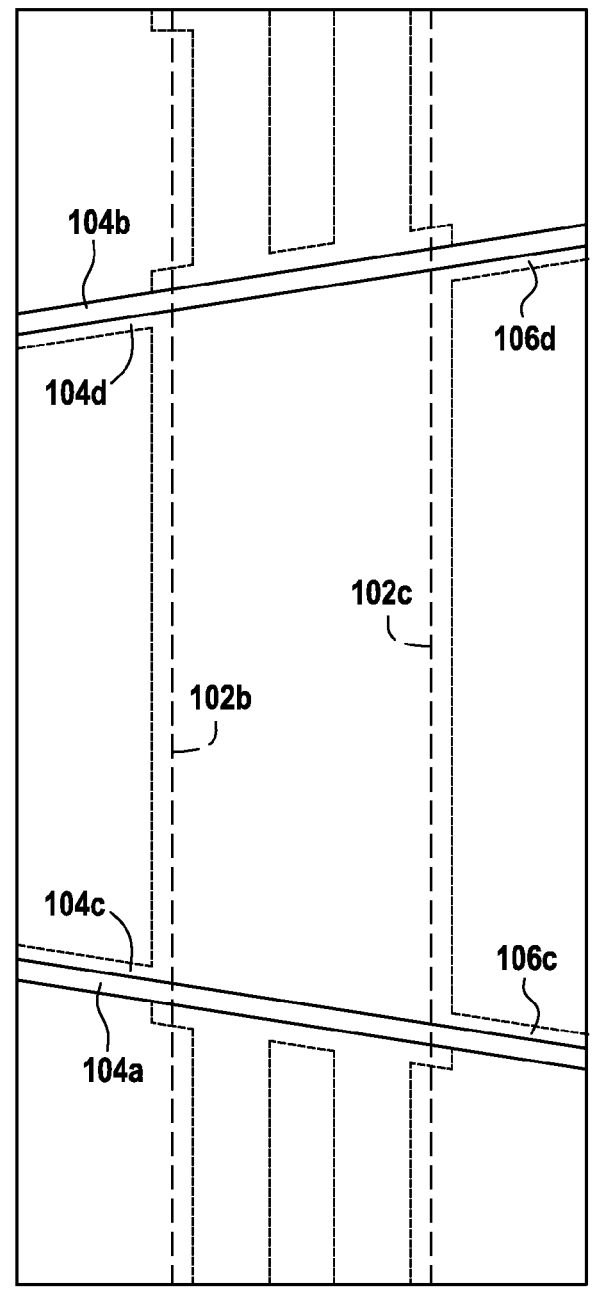
Figure 12:
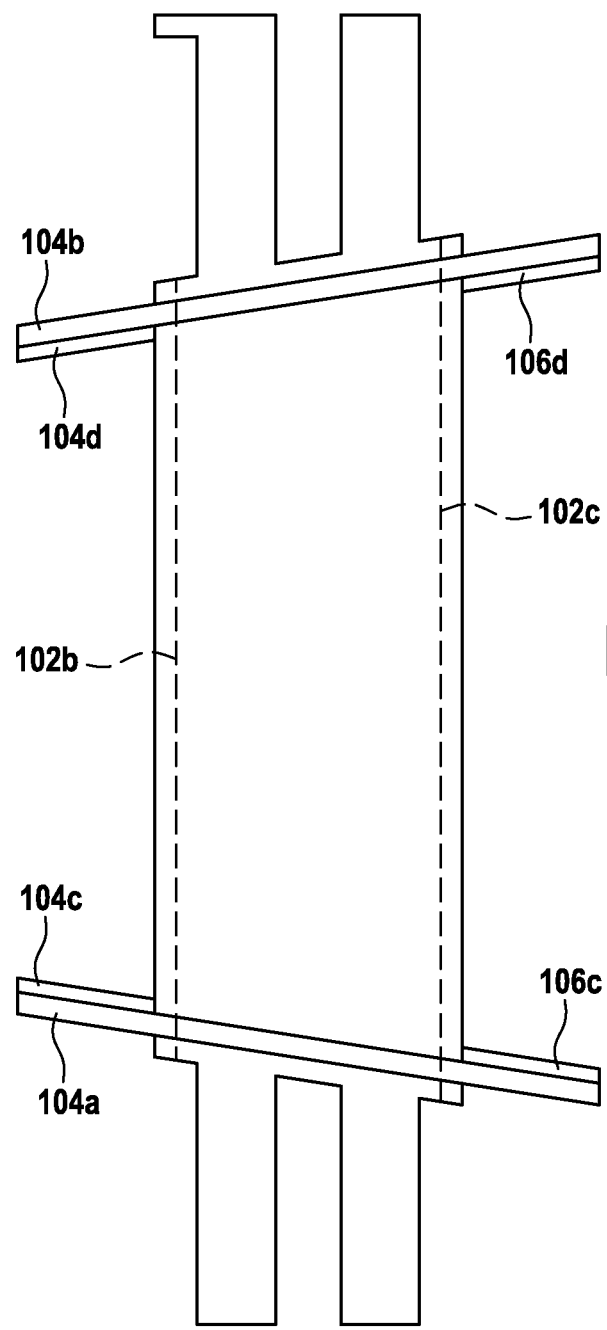

Thereafter, cuts are made along the dotted lines in FIG. 11 to eliminate excess parts firstly from the segments of the portion 102 situated on the inside of the folded-out segments 104a and 106a and on the outside of the folded-out segments 104b and 106b, and secondly in the segment of the blank 101 that extends between the folded-out segments, so as to leave only portions that are useful for forming a preform portion for the airfoil of the vane that is to be fabricated and for forming preform portions for the outer attachment tabs and for the inner tabs. Woven interlinking is preferably also allowed to remain between the portions 102, 104, and 106 along the entire length of the blank 101 in zones that extend along the connections between the segments 104a, 104b, 106a, and 106b with the remainder of the blank, thus forming beads 104c, 106c and 104d, 106d. This serves to ensure continuity in the interlinking between the segments 104a and 106a, between the segments 104b and 106b. FIG. 12 shows the result obtained after cutting out. It can be seen that the portions that are useful for forming preform portions for the outer attachment tabs and for the inner tabs extend entirely in continuity with the portion that is useful for forming the airfoil preform portion.

It should be observed that 3D weaving when weaving the blank 101 could be omitted, at least in some of the parts that are eliminated by being cut away.

Figure 13:
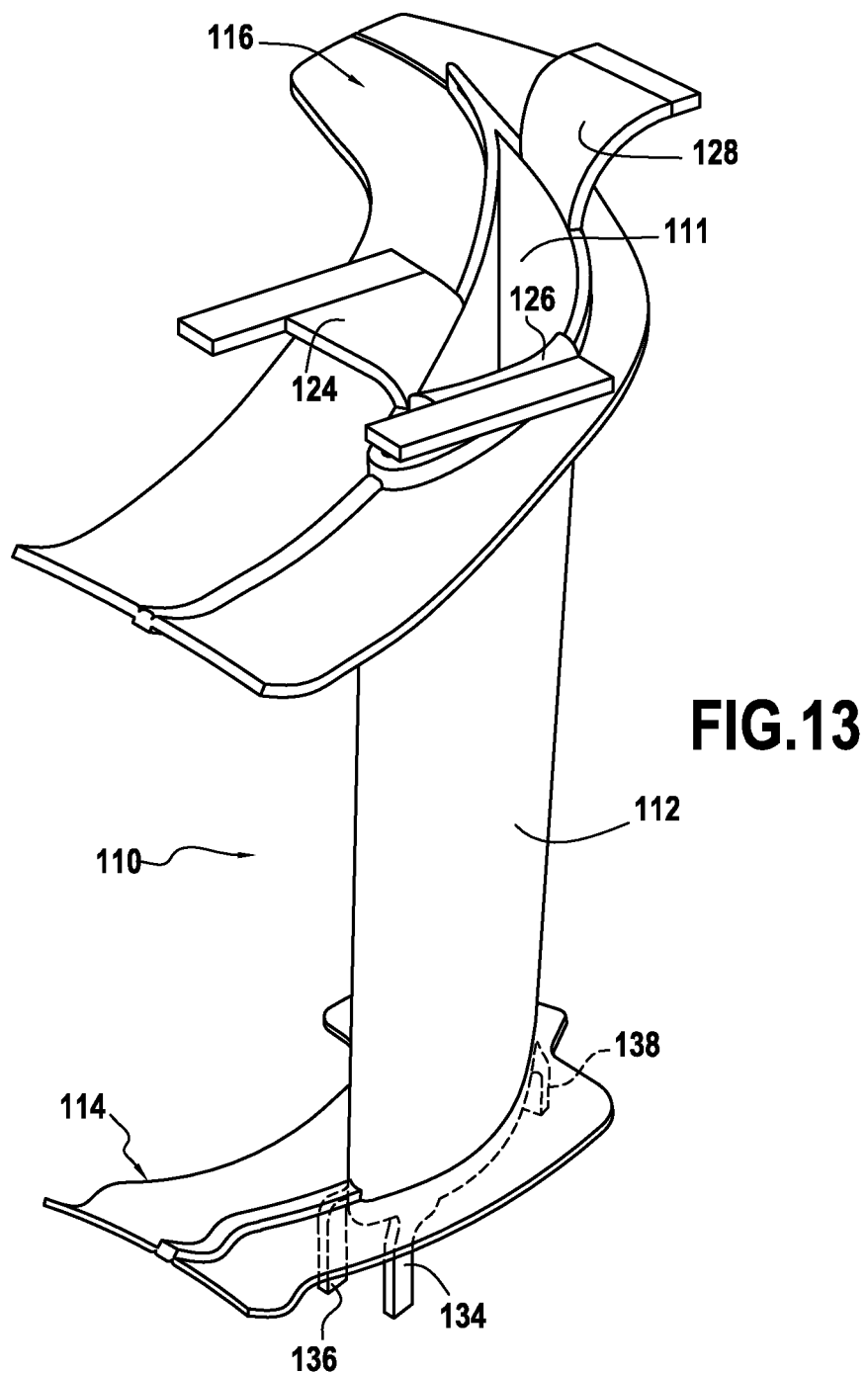

A fiber preform for the vane to be fabricated is then made by molding by using shaping tooling with deformation to obtain the desired hollow airfoil profile and the desired platform shapes. A preform 110 is thus obtained (FIG. 13) with a preform portion 112 for the hollow airfoil, preform portions 114 and 116 for the inner and outer platforms, preform portions 124, 126, and 128 for the outer attachment tabs, and preform portions 134, 136, and 138 for the inner tabs. The internal passage 111 in the preform portion 112 for the hollow airfoil is formed by inserting a tooling element into the non-interlinked zone 102a.

In the preform 110, the preform portion 124, 126, or 128 for each outer attachment tab lies fully in continuity with the preform portion for the pressure side wall or the suction side wall of the airfoil in line with which it is situated. The same applies for the preform portion for each inner tab. There is also continuity between the preform portion for the airfoil and the preform portions for the inner and outer platforms.

A hollow vane of CMC material such as that shown in FIGS. 1 to 3 may be fabricated as follows.

A fiber strip 100 is woven by three-dimensional weaving, the strip comprising a plurality of fiber blanks 101 e.g. extending in the warp direction, including non-interlinked zones, as shown in FIG. 5. The weaving may be performed using yarns made of ceramic, in particular yarns based on silicon carbide (SiC), e.g. yarns supplied under the name "Nicalon" by the Japanese supplier Nippon Carbon. Other ceramic yarns can be used, in particular yarns made of refractory oxide such as yarns based on alumina $Al_2O_3$, in particular for CMC materials of the oxide/oxide type (fiber of the fiber reinforcement and matrix both made of refractory oxide). It is also possible to use carbon fibers for a CMC material having carbon fiber reinforcement.

The fiber strip may be treated to eliminate the sizing present on the fibers and to eliminate the presence of oxide on the surface of the fibers, in known manner.

Also in known manner, a thin layer of embrittlement-relief interphase coating may then be formed on the fibers of the fiber strip by chemical vapor infiltration (CVI). By way of example, the interphase material may be pyrolytic carbon PyC, boron nitride BN, or boron-doped carbon BC. The thickness of the layer that is formed may lie for example in the range 10 nanometers (nm) to 100 nm in order to conserve a capacity for deformation in the fiber blanks.

The fiber strip is then impregnated with a consolidation composition, typically a carbon precursor resin or a ceramic precursor resin, possibly diluted in a solvent. After drying, the individual fiber blanks are cut apart. Each blank is shaped (as shown in FIGS. 10 to 12) and placed in tooling for shaping the preform portions for the airfoil, for the inner and outer platforms, for the outer attachment tabs, and for the inner tabs.

Thereafter, the resin is cured, and then pyrolyzed after being removed from the shaping tooling in order to obtain a vane preform consolidated by the pyrolysis residue. The quantity of consolidation resin is selected to be sufficient but not excessive so that the pyrolysis residue bonds the fibers of the preform together so as to make the preform capable of being handled while conserving its shape without assistance from tooling.

A second embrittlement-relief interphase coating layer may be formed by CVI, e.g. out of PyC, BN, or BC. The making of an interphase coating using two layers one before and the other after consolidation is described in Document EP 2 154 119.

Thereafter, the consolidated preform is densified with a ceramic matrix, e.g. by CVI. The matrix may be made of SiC or it may be a self-healing matrix having matrix phases of pyrolytic carbon PyC, of boron carbide $B_4C$, or of an Si—B—C ternary system, as described in particular in Documents U.S. Pat. No. 5,246,736 and U.S. Pat. No. 5,965,266. It is possible to envisage other types of matrix that are ceramic or at least essentially ceramic, and in particular matrices made of refractory oxide, e.g. of alumina, in particular for CMC materials of the oxide/oxide type.

Densification is preferably performed in two steps separated by a step of machining the vane to its desired dimensions, in particular in order to eliminate ridges resulting from the beads 104c, 106c, 104d, and 106d, to obtain the final shape desired for the platforms 14 and 16, for the outer attachment tabs, and for the inner tabs, and possibly to obtain the profile desired for the airfoil 12.

Figure 14:
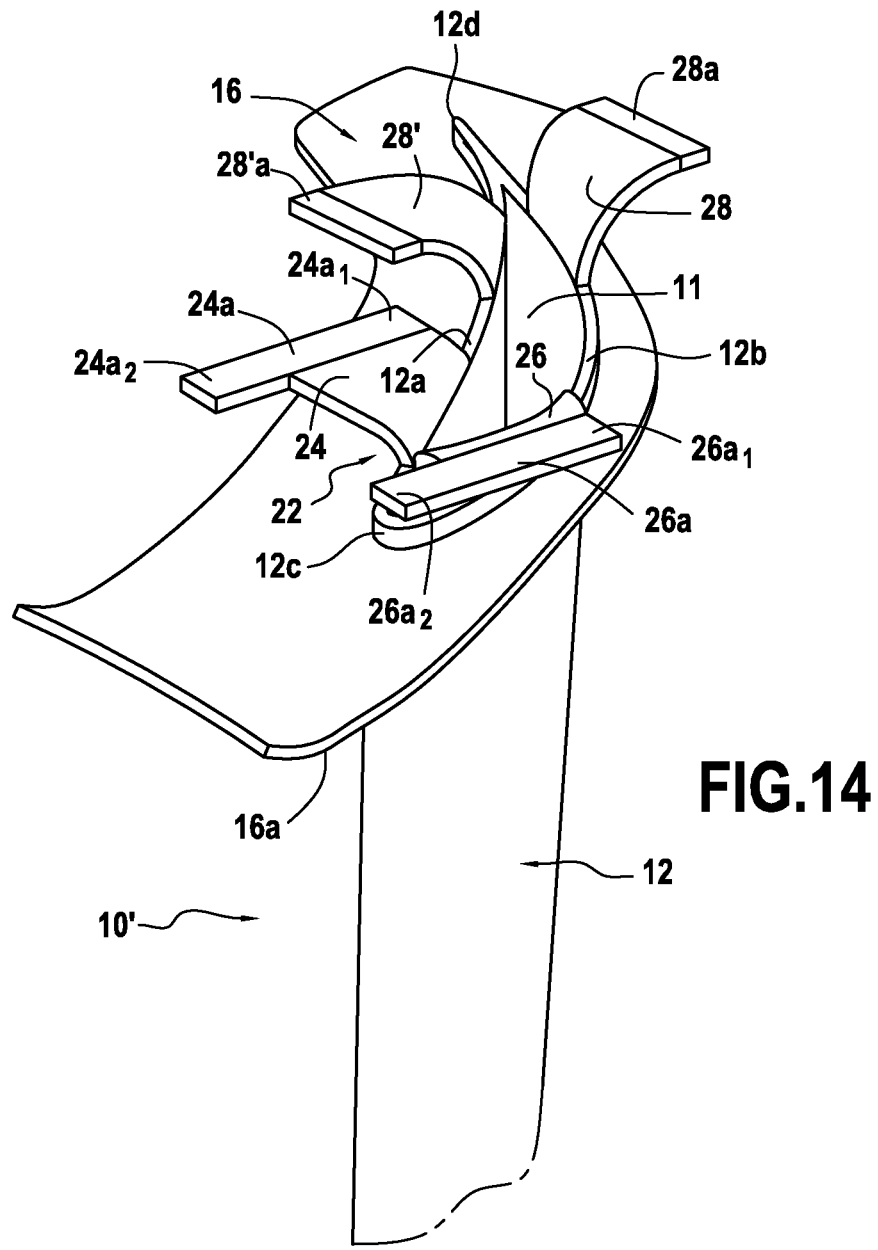
FIG. 14 is a fragmentary diagrammatic view in perspective showing a variant embodiment of the FIG. 1 vane.
Figure 15:
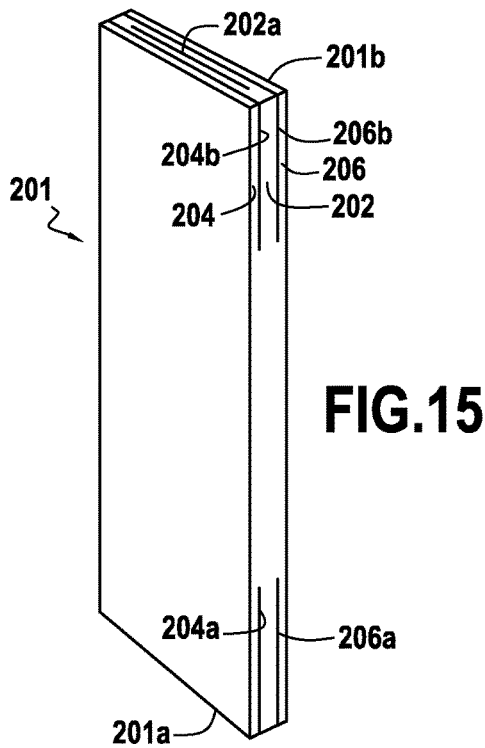
FIG. 15 is a diagrammatic perspective view of a fiber blank for use in making an airfoil fiber preform for a vane of the type shown in FIG. 1, in a second method of fabricating such a vane.

FIG. 14 shows a portion of a hollow airfoil vane for a turbine nozzle in a variant embodiment of the FIG. 1 vane 10, in which portions that are identical or similar are given the same reference signs.

The vane 10' of FIG. 14 differs from the vane 10 of FIG. 1 in that the downstream attachment portion has a second attachment tab 28' that is situated in line with a portion of the pressure side wall 12a of the airfoil 12, substantially in register with the attachment tab 28. The attachment tab 28' is of a shape that is curved towards the pressure side and it presents a terminal portion 28'a having outer and inner faces that are situated substantially in the same respective annular surfaces as the outer and inner faces of the terminal portion 28a of the attachment tab 28.

In additional variants, it is possible to form the downstream attachment portion using the tab 28' on its own or using a plurality of tabs in line with portions of the pressure side wall 12a of the airfoil 12.

Naturally, on the inside, it is also possible to have at least two downstream inner tabs in line with a portion of the suction side wall of the airfoil and a portion of the pressure side wall of the airfoil, respectively.

A second method of fabricating a vane of the type shown in FIGS. 1 to 3 is described in below with reference to FIGS. 15 to 19.

A blank 201 from which a preform portion for the vane airfoil is subsequently formed is obtained from a strip woven by 3D weaving.

The blank 201 (FIG. 15) comprises across its thickness a first portion 202 situated between a second portion 204 and a third portion 206. The portion 202 is interlinked with the portions 204 and 206 by 3D weaving except in non-interlinked zones 204a, 204b, and 206a, 206b. The non-interlinked zones 204a and 206a extend across the entire width of the blank 201 from a first longitudinal end 201a thereof as far as boundaries of non-interlinking that are situated substantially at the future location of the inner platform of the vane that is to be fabricated. The non-interlinked zones 204b and 206b extend across the entire width of the blank 201 from its opposite longitudinal end 201b as far as boundaries of non-interlinking that are situated substantially at the future location of the outer platform of the blank that is to be fabricated. In addition, a non-interlinked zone 202a is formed substantially in the middle of the portion 202 over the entire length of the blank 201 at a distance from its longitudinal edges. The non-interlinked zone 202a is for enabling the internal passage to be formed in the airfoil of the vane that is to be fabricated. The non-interlinked zones are formed in the manner described above for the blank 101 shown in FIGS. 5 to 9.

Figure 16:
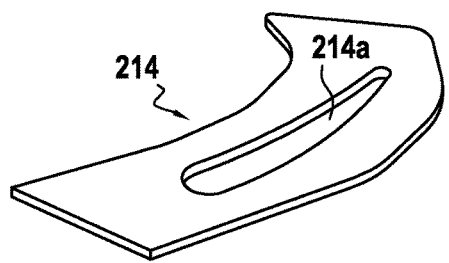
FIGS. 16 and 17 are diagrammatic perspective views of consolidated preforms respectively for an inner platform and for an outer platform, for use in making a vane preform in the second fabrication method.
Figure 17:
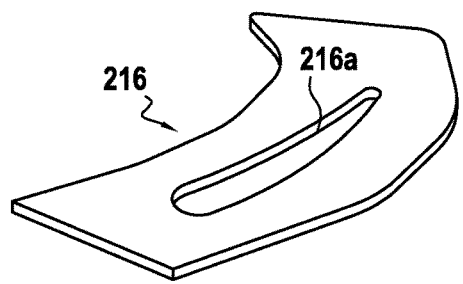

A consolidated inner platform preform 214 is made separately (FIG. 16). The preform 214 is obtained from a 3D woven fiber structure that is given the desired shape by shaping in tooling and by being consolidated. Consolidation may be performed as described above by impregnation with a consolidation composition containing a resin, by drying, and by curing the resin, after previously forming a thin first layer of interphase coating on the fibers of the fiber structure. The preform 214 as consolidated in this way is machined to its final shape with an opening 214a being formed therein having a shape that corresponds to the shape of the profile of the airfoil of the vane that is to be fabricated at the level of the inner platform.

In the same manner, a consolidated outer platform preform 216 (FIG. 17) is made separately, with an opening 216a having a shape corresponding to the shape of the profile of the airfoil of the vane that is to be fabricated at the level of the outer platform.

Figure 18:
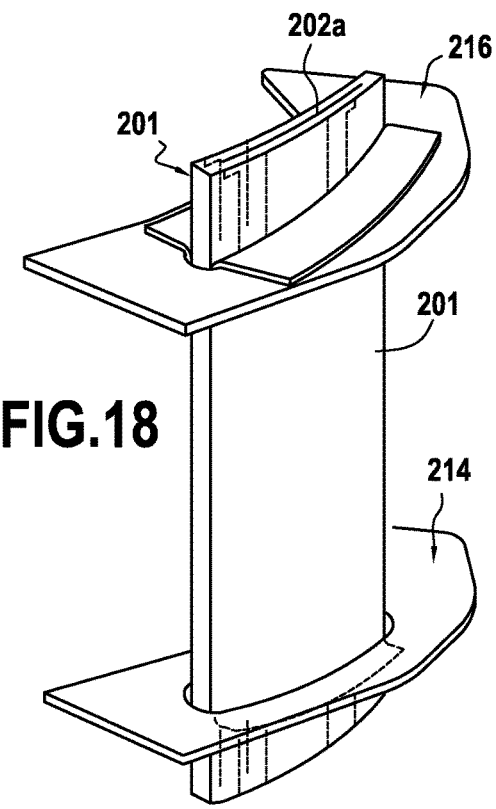
FIGS. 18 and 19 show two steps of obtaining a vane preform from the fiber blank of FIG. 15 and the consolidated preforms of FIGS. 16 and 17, in the second fabrication method.

After forming a first thin interphase coating layer on the fibers of the fiber blank 201, and after impregnating it with a consolidation composition, and drying it, the consolidated preforms 214 and 216 are engaged on the fiber blank 201 with the fiber blank 201 being deformed (FIG. 18). The flaps constituted by the segments of the portions 204 and 206 adjacent to the non-interlinked zones 204a and 206a are deployed and folded against the inner face of the consolidated preform 214, and they may be bonded thereto, e.g. by implanting needles. In similar manner, the flaps constituted by the segments of the segments 204 and 206 adjacent to the non-interlinked zones 204b and 206b are deployed and folded down against the outer face of the consolidated preform 216, and they may be bonded thereto.

Figure 19:
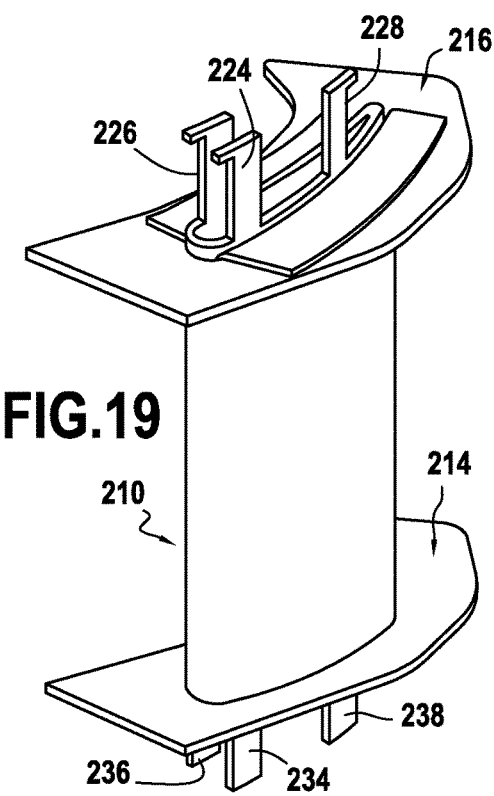

Lines of cut (shown as dotted lines in FIG. 18) are formed in the longitudinal end segments of the portion 202 on the outside of the consolidated preform 216 and on the inside of the consolidated preform 214 in order to obtain portions that are to form preform s 224, 226, and 228 for outer attachment tabs, and preform portions 234, 236, and 238 for inner tabs of the vane that is to be fabricated (FIG. 19).

A consolidated preform 210 of the vane to be fabricated is obtained (FIG. 19) by shaping in tooling, by curing the resin of the consolidation composition in the preform portions for the airfoil, for the outer attachment tabs, and for the inner tabs, by pyrolyzing the consolidation resin of the preform portions for the airfoil, for the outer attachment tabs, for the inner tabs, and for the platforms, by forming a second interphase coating layer, and by densifying with a ceramic matrix, possibly also with final machining. In the preform 210, the preform portion for each outer attachment tab lies entirely in continuity with the preform portion for the pressure side wall or the suction side wall of the airfoil in line with which it is situated. The same applies for the preform portion for each inner tab.

The materials used for constituting the fibers of the fiber blank 201 and of the consolidated preforms 214 and 216, the interphase coating layers, and the matrix may be similar to those specified above for the first described fabrication method.

The description above relates to making a turbine nozzle vane out of CMC material. The invention is equally applicable to compressor diffuser vanes for mounting in a compressor casing. Under such circumstances, when the temperatures encountered in operation are lower, in particular for the upstream stages of a compressor, it is possible to use a material that is not a CMC material, but rather an organic matrix composite (OMC) material made using fibers such as carbon fibers or glass fibers, for example, together with a polymer matrix.

Thus, after weaving a set of fiber strips, cutting out individual blanks, and shaping by means of shaping tooling, in the manner described above, each resulting vane preform held in its tooling is impregnated with a resin by injection or infusion. Heat treatment for curing the resin is performed in order to obtain a vane preform. A plurality of successive cycles of impregnation with a resin and of curing the resin may be performed. A final machining operation may optionally be performed. The resin used for consolidation and for densification is a precursor resin for the polymer matrix, such as an epoxy, a bismaleimide, or a polyimide resin, for example.

In the same manner as for turbine nozzle vanes, the hollow airfoil vanes of a compressor diffuser are mounted in the casing of the compressor with a sealing shroud arranged on the outside of the vanes that present orifices in communication with the internal passages in the vane airfoils. Ventilation tubes extending in the internal passages of the vane airfoils may be connected to the shroud by tubular connection parts.

In all of the embodiments described, a vane is obtained in which the fiber reinforcing texture for each outer attachment tab lies entirely in continuity with the fiber reinforcing texture for the pressure side wall or for the suction side wall of the airfoil in line with which the outer attachment tab is situated. It is thus ensured that loads are transferred directly between the aerodynamic profile of the airfoil and the casing via the attachment tabs because of the continuity of the fiber reinforcement texture.

In addition, the fiber reinforcement texture of each inner tab, if any, is also entirely in continuity with the fiber reinforcement structure of the pressure side wall or the suction side wall of the airfoil in line with which the inner tab is situated.

The invention claimed is:

1. A turbine engine vane, the vane being made of composite material comprising a fiber reinforcing structure densified by a matrix and comprising:

a hollow airfoil having an internal passage extending along its entire length between a pressure side wall and a suction side wall of the airfoil, an inner platform, and an outer platform, wherein the airfoil is extended on the outside of the outer platform by an upstream attachment portion and by a downstream attachment portion for mounting the vane in a casing, the upstream attachment portion includes an upstream attachment tab that is an extension from the pressure side wall or the suction side wall of the airfoil, the upstream attachment tab being rounded in shape to extend at an angle to the pressure side wall or the suction side wall from which it extends, the downstream attachment portion includes a downstream attachment tab that is an extension from the pressure side wall or the suction side wall of the airfoil, the downstream attachment tab being rounded in shape to extend at an angle to the pressure side wall or the suction side wall from which it extends, and the fiber reinforcing texture of each of the upstream attachment tab and the downstream attachment tab is in continuity with the fiber reinforcing texture of the pressure side wall or the suction side wall in line with which the tab is situated.

2. A vane according to claim 1, wherein the downstream attachment portion includes at least one downstream attachment tab situated in line with a portion of the suction side wall or of the pressure side wall between a leading edge and a trailing edge of the airfoil.

3. A vane according to claim 1, wherein the upstream attachment portion includes at least one upstream attachment tab situated in line with a portion of the pressure side wall or of the suction side wall in the vicinity of a leading edge of the airfoil.

4. A vane according to claim 3, wherein the upstream attachment portion comprises two upstream attachment tabs situated respectively in line with a portion of the pressure side wall and in line with a portion of the suction side wall in the vicinity of the leading edge of the airfoil.

5. A vane according to claim 1, wherein, on the inside of the inner platform, the airfoil is extended by inner tabs extending from inner longitudinal ends of the pressure side and suction side walls of the airfoil with continuity of the reinforcing fiber texture between said walls and said tabs.

6. A vane according to claim 5, wherein the inner tabs comprise at least a downstream inner tab situated in line with a portion of the suction side wall or with the pressure side wall between the leading edge and the trailing edge of the airfoil.

7. A vane according to claim 5, wherein the inner tabs comprise at least an upstream inner tab situated in line with a portion of the pressure side wall or of the suction side wall in the vicinity of a leading edge of the airfoil.

8. A vane according to claim 7, wherein the inner tabs comprise two upstream inner tabs situated respectively in line with a portion of the pressure side wall and with a portion of the suction side wall in the vicinity of the leading edge of the airfoil.

9. A vane according to claim 1, wherein the fiber reinforcing texture of the airfoil is a fabric obtained by three-dimensional weaving.

10. A vane according to claim 1, presenting continuity of the fiber reinforcing texture between the airfoil and the inner and outer platforms.

11. A turbine engine turbine comprising a turbine casing and at least one turbine nozzle including a set of vanes according to claim 1.

12. A turbine according to claim 11, wherein the vanes are mounted in the turbine casing with a sealing shroud arranged on the outside, and the shroud presents orifices in communication with the internal passages of the airfoils of the vanes.

13. A turbine according to claim 12, wherein ventilation tubes extend in the internal passages of the vanes and are connected to the shroud by tubular connection parts.

14. A turbine engine having a turbine according to claim 11.

15. A turbine engine compressor comprising a compressor casing and at least one compressor diffuser including a set of vanes according to claim 1.

16. A compressor according to claim 15, wherein the vanes are mounted in the compressor casing with a sealing shroud arranged on the outside, and the shroud presents orifices in communication with the internal passages of the airfoils of the vanes.

17. A compressor according to claim 16, wherein the ventilation tubes extend in the internal passages of the vanes and are connected to the shroud by tubular connection parts.

18. A turbine engine having a compressor according to claim 15.

19. A vane according to claim 1, wherein the upstream attachment tab, the downstream attachment tab, or both, extend generally perpendicular to the pressure side wall or the suction side wall from which it extends.

20. A vane according to claim 1, wherein the upstream attachment tab and the downstream attachment tab each have a terminal portion that extends substantially axially with a common annular surfaces about an axis that is an axis to which the vane is configured to be mounded.

* * * * *